United States Patent [19]
Yearsley et al.

[11] Patent Number: 5,386,469
[45] Date of Patent: Jan. 31, 1995

[54] FIRMWARE ENCRYPTION FOR MICROPROCESSOR/MICROCOMPUTER

[75] Inventors: Gyle Yearsley, Boise; Grant Richards, Meridian, both of Id.

[73] Assignee: Zilog, Inc., Campbell, Calif.

[21] Appl. No.: 102,416

[22] Filed: Aug. 5, 1993

[51] Int. Cl.$^6$ .................. G11B 23/28; H04L 9/00
[52] U.S. Cl. ........................... 380/3; 380/4; 380/23; 380/25
[58] Field of Search ................ 380/3, 4, 23, 25

[56] References Cited
U.S. PATENT DOCUMENTS 4,797,928  1/1989  Dykes .
4,905,277  2/1990  Nakamura .

Primary Examiner—David C. Cain
Attorney, Agent, or Firm—Majestic, Parsons, Siebert & Hsue

[57] ABSTRACT

A mask value generator is used to produce a mask value for deencrypting encrypted instructions from a memory. This encryption mask generator can produce a encryption mask value from a seed value and a program counter value. The seed value can stored in a memory outside the core microprocessor. The encryption mask value can be used to deencrypt instructions in an "exclusive or" logic section.

16 Claims, 4 Drawing Sheets

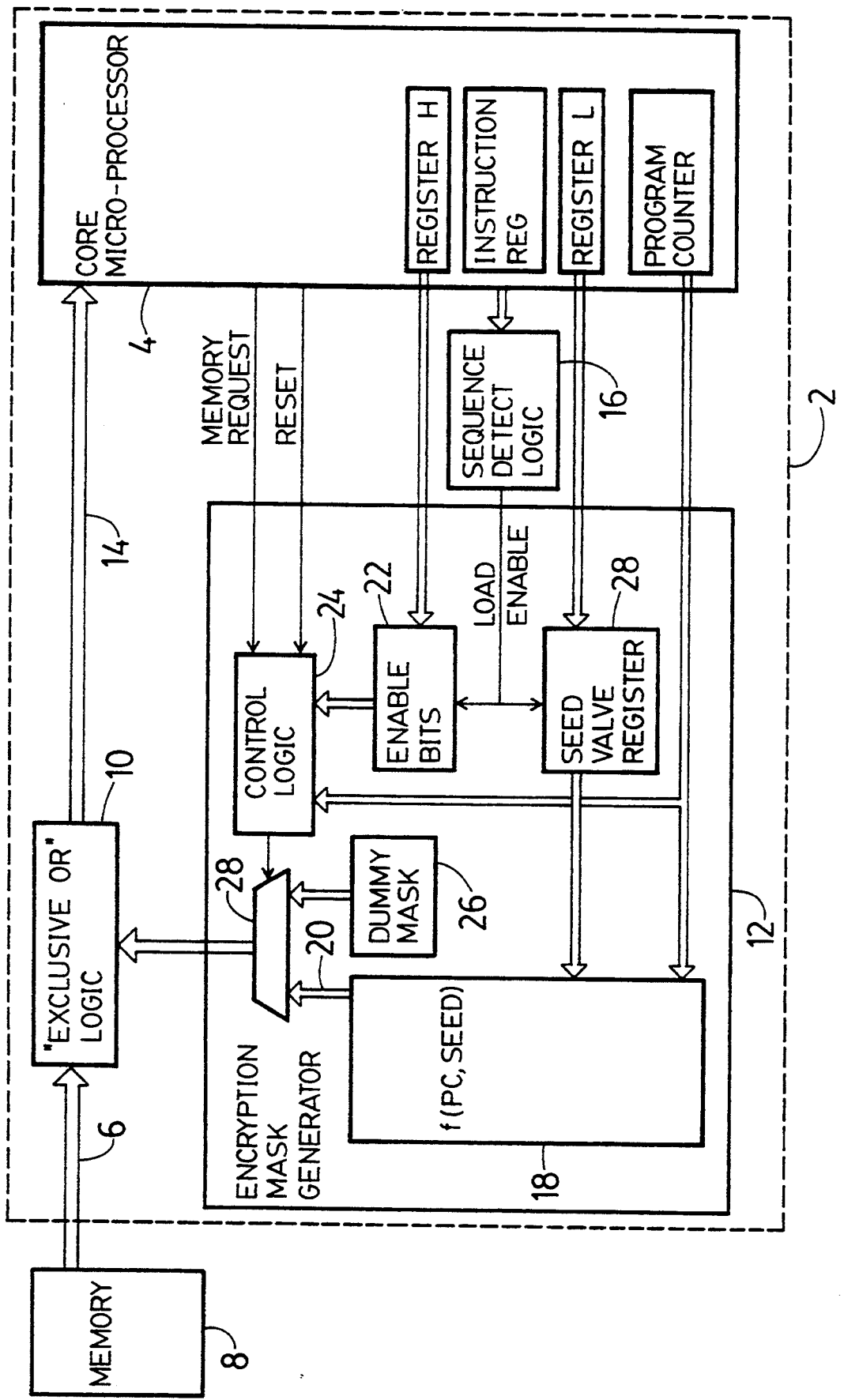
FIG._1.

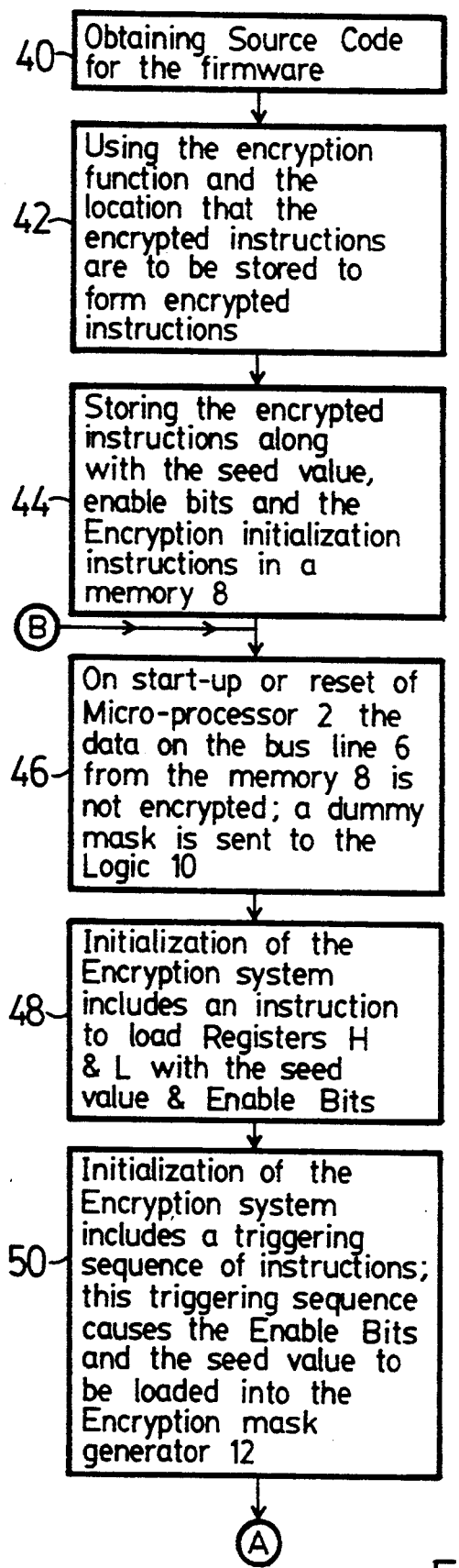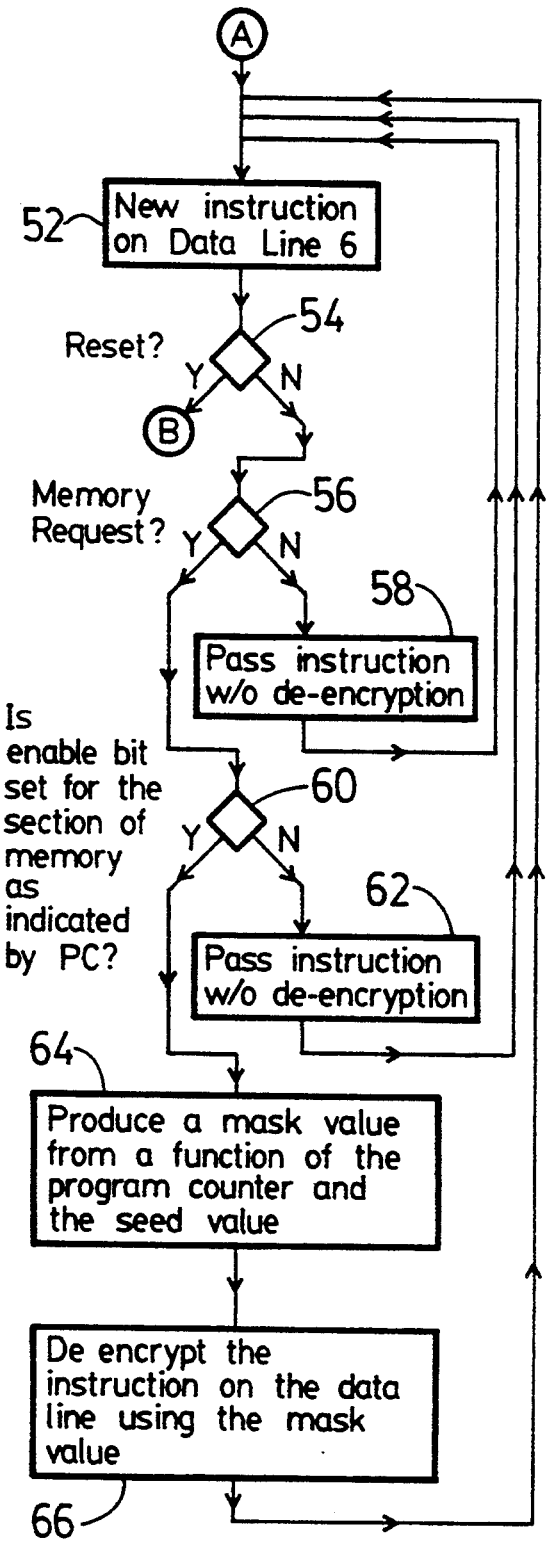
FIG._2A.

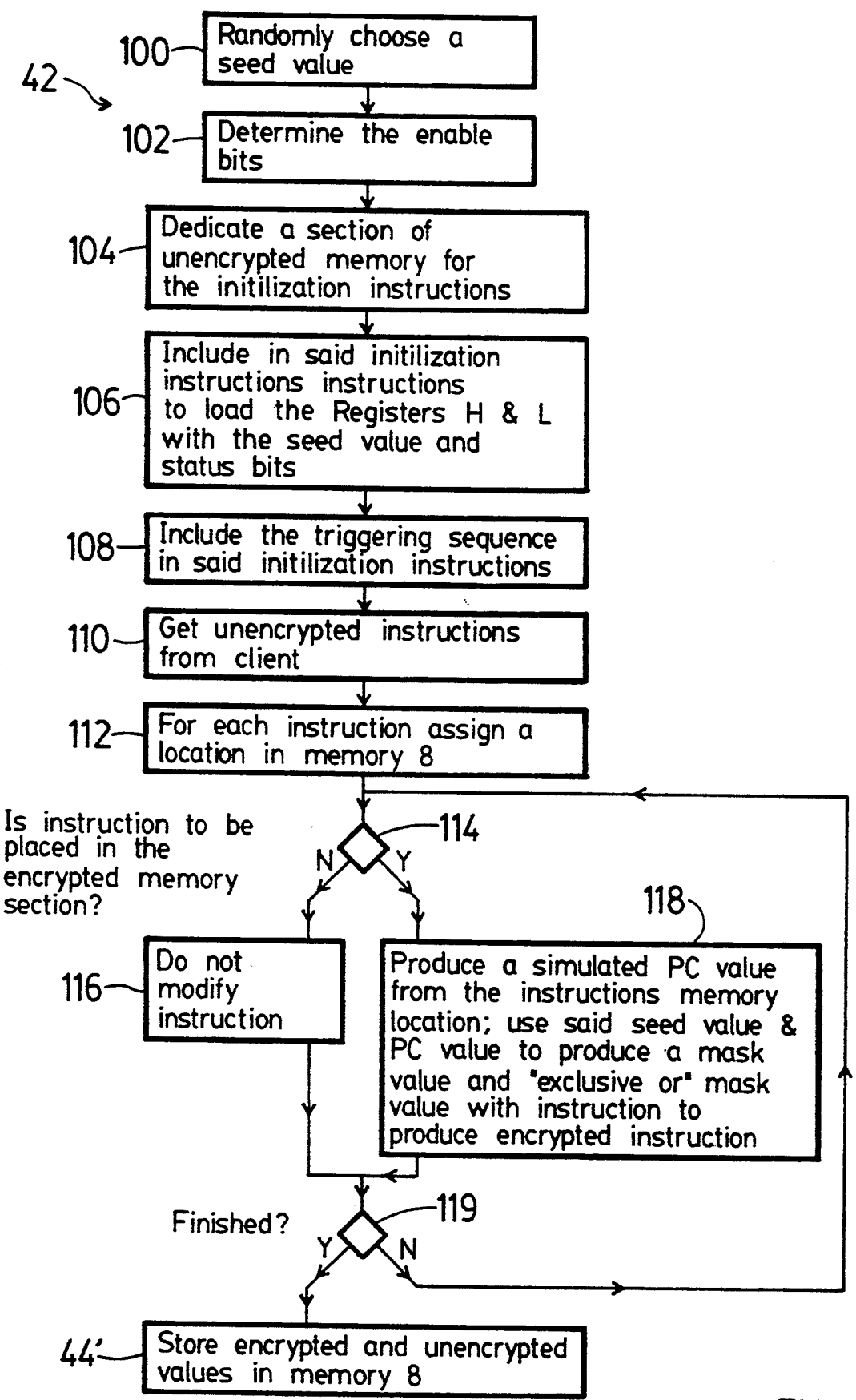
FIG_2B.

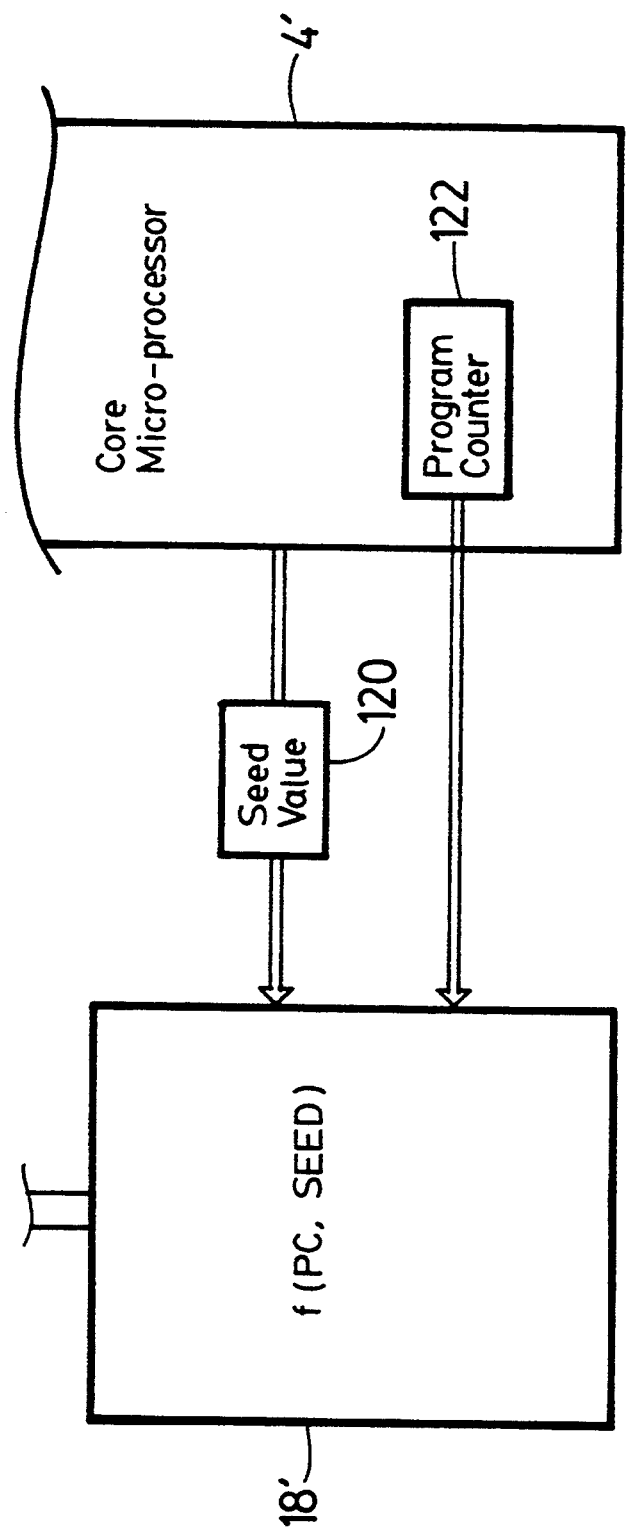
FIG._3.

FIRMWARE ENCRYPTION FOR MICROPROCESSOR/MICROCOMPUTER

BACKGROUND OF THE INVENTION

This invention relates to a system and apparatus to deencrypt firmware which is stored in a memory. Encryption of the firmware stored in memory prevents third parties from determining the program stored in the memory by reading out the information in the memory and decompiling this information to determine the program stored therein.

A prior art deciphering system for use with a microcomputer is described in Nakamura, U.S. Pat. No. 4,905,277 entitled "Method For Enciphering and Deciphering Instructions in a Microcomputer, and a Microcomputer Used For Effecting Same". This system uses two different types of instruction codes which can be decoded by two different types of instruction decoders following two different types of decoding formats. One type of decoding format is used for odd addresses in the memory and another type of decoding format is used for even addresses in the memory. Although this system makes it more difficult to decompile the software stored in the memory, it may be possible for someone who knows the two different instruction codes to determine the software stored in the memory. In addition, this system requires changes to the core microcomputer or microprocessor in that two different instruction decoders are required. The use of two different instruction decoders may make the system harder to test.

It is desired to have an improved method and apparatus for deencrypting encrypted instructions stored in a memory. It is also desired to have an improved method that does not require substantial changes to a core microprocessor or microcomputer and that does not interfere with the testing of the microprocessor or microcomputer.

SUMMARY OF THE INVENTION

The invention comprises using the program counter value to produce a mask value which can be used to mask the instructions sent on the data bus from the memory to the core microprocessor. Another part of the invention involves using enable bits to determine which sections of the memory will be deencrypted with the mask values. A seed value and enable bits can be stored in the memory and then during the initialization process the information can be loaded into the encryption mask generator in order to deencrypt sections of the memory. The encryption mask generator uses the program counter value and the seed value to produce a mask value that is used by the deencrypting logic. The deencrypting logic may be an "exclusive or" logic which would "exclusive or" the bits of the mask value with the bits of the encrypted instructions from the memory. The use of a "exclusive or" logic means that the same mask values used to deencrypt the firmware instructions can be used to encrypt the firmware before it is placed in the memory.

The core microprocessor need not be significantly modified by deencryption system. The normal registers in the core microprocessor could be used for inputting the enable bits and seed value. Two registers in the core microprocessor can be connected so that the seed and enable bits are loaded from the registers to the encryption mask generator when sequence detect logic detects a sequence of instructions in the instruction register of the core microprocessor.

BRIEF DESCRIPTION OF THE DRAWINGS

The above and other features and aspects of the present invention will become more apparent upon reading the following detailed description in conjunction with the accompanying drawings, in which:

FIG. 1 is a schematic view of the microprocessor of the present invention;

FIG. 2A and 2B are a flow chart showing the method of the present invention; and FIG. 3 is a partial schematic view of another embodiment of the microprocessor of the present invention.

DETAILED DESCRIPTION OF THE PREFERRED EMBODIMENT

FIG. 1 is a schematic view of the microprocessor 2 of the present invention. The microprocessor 2 includes a core microprocessor 4. This core microprocessor 4 could be for example, Zilog's Z80 microprocessor. The present invention is designed so that the core microprocessor 4 does not have to be substantially modified in order that the firmware stored in the memory 8 can be encrypted. The microprocessor 2 also includes an databus 6 which is connected to an memory 8 and logic 10 which is used to deencrypt the encrypted data stored in the memory 8. The memory 8 could be external or internal to the microprocessor 2. In the preferred embodiment, the logic 10 is "exclusive or" logic which can "exclusive or" together the bits of the encrypted instructions from the memory 8 and the bits of the mask value from the encryption mask generator 12. A bus 14 goes from the "exclusive or" logic 10 to the core microprocessor 4. This bus 14 is used for transferring the deencrypted instruction to the core microprocessor 4 where the core microprocessor 4 can use these instructions as is known in the art.

In the preferred embodiment, during a test mode or upon start up of the microprocessor 2 the data on databus 6 is not effected by the "exclusive or" logic 10 when it is transferred on bus 14 to the core microprocessor 4. During the initialization of the core microprocessor 4, instructions in the memory 8 for loading two registers such as register H and register L in the core microprocessor 4 with a seed value and enable bits are run. As will be described below, the seed value and enable bits were used in the encryption of some of the instructions in the memory 8. Next, a sequence of instructions from the memory 8 is sent to the core microprocessor 4 without being modified by the logic 10. This sequence of instructions is a sequence that would not normally be used by a programmer. For example, the values in some registers of the core microprocessor 4 can be transferred back and forth a number of times. Sequence detect logic 16 in the microprocessor 2 can detect the sequence of the instructions in the instruction register of the core microprocessor 4. When the proper sequence is detected, the enable bits can be loaded from register H to the enable bit register 22 in the encryption mask generator 12 and the seed value can be loaded from register L to the seed value register 28. Note that register H or register L could be any register in the core microprocessor 4.

As discussed above, it is important that the sequence of instructions be one that would not be used by a programmer. In addition, the software which encrypts the instructions in order to place the encrypted instructions into the memory 8 may also check these instructions to make sure that the loading sequence is not used any other place in the software.

In the present embodiment, the encryption mask generator uses the program counter value and the seed value to produce a mask value. Logic 18 receives the program counter value and the seed value and produces a mask value on output 20. The logic 18 can be comprised of configurable logic such as "exclusive or" and parity bit generators. The specific implementation of the logic 18 is not important as long as the implementation can produce mask values which are sufficiently random and can be produced quickly enough that the production of a mask value in logic 18 does not slow the memory instruction retrieval from the memory 8. In a preferred embodiment, the logic 18 produces a non-repeating sequence of mask values that is unique for each different seed value.

The enable bits are stored in an internal register 22. The use of the enable bits determines whether the instruction from memory 8 is to be deencrypted or not. In one embodiment of the present invention, the program counter value and the enable bit values are sent to a control logic 24. In the preferred embodiment, the 64 k memory 8 is divided into 8 k blocks each of which has an associated enable bit which is stored in register 22. The control logic 24 can by using the program counter value from the core microprocessor 4 determine whether the data from the memory 8 is to be deencrypted or not. For example, if the enable bit is set the mask value from logic 18 is used and if the enable bit is not set a dummy mask 26 is used. The dummy mask for "exclusive or" logic have logical zero's in all the bits. The use of a dummy mask 26 would allow the instruction on the databus 6 to pass to databus 14 unaffected by logic 10. The control logic 24 can also be used to ensure that the dummy mask 26 is sent to the logic 10 unless the core microprocessor 4 is doing a memory request. Additionally, the control logic 24 can ensure that upon reset of the microprocessor 2, a dummy mask value is sent to the "exclusive or" logic 10. For this reason, during testing of the microprocessor 2, the deencryption system will not be used. Alternately, the enable bits stored in register 22 could be set to zero upon a reset to ensure that the instructions from the memory 8 are not modified during the initialization or testing. Note that the encryption mask generator 12 will send a dummy mask to the logic 10 for those segments of the memory that are not meant to be deencrypted. The initialization instructions can be stored in these sections.

In this embodiment, the encryption mask generator 12 uses a multiplexer 28 that multiplexes between the mask value from logic 18 and the dummy mask value 26. Encryption mask generator 12 need not include all of the structures shown in FIG. 1. For example, a minimal encryption mask generator could be as shown in FIG. 3 comprised of the logic 18' which produces a function of the program counter value in the seed connected up to a register 120 for storing the seed value and the program counter 122 in the core microprocessor 4'. If the logic 18' is chosen such that all the mask values produced from a seed value having a "logical zero" in every bit produces a mask value having a "logical zero" in every bit and the register 120 is set to all logical zeroes upon a reset, then the system shown in FIG. 3 could potentially be used for deencrypting encrypted instructions from the memory.

Looking at FIG. 1, if the memory 8 is external to the microprocessor 2, a benefit of the present invention is that the seed value need not be stored in the ROM (not shown) of the microprocessor 2. The disadvantage of permanently storing a seed value in the microprocessor 2 is that a different seed value needs to be stored in the microprocessor for each customer. This may require different processing masks for each customer. Since in the present invention the seed value can be brought into the microprocessor 2 from the memory 8, the same microprocessor 2 could be used with different memories encrypted with different seed values.

FIG. 2A is a block diagram showing the method of the present invention. In step 40, the source code is obtained from the client for the firmware to be stored in the memory 8 of FIG. 1. In step 42, using the encryption function and the location that the encrypted instructions are to be stored, the encrypted and unencrypted instructions can be produced.

Step 42 is illustrated in FIG. 2B. In step 100 of FIG. 2B, a seed value is chosen from the valid seed values. A valid seed value will produce a non-repeating sequence of masking values for the different program counter values. In step 102, the enable bit values are determined. This can be determined by figuring what sections of the memory 8 the client or the designer desires to encrypt. In step 104, a section of the memory dedicated to unencrypted memory as indicated by the enable bits is selected for placing the initialization instructions for the microprocessor 2. In step 106, the initialization instructions are provided including instructions to load the registers H and L with a seed value and enable bits. In step 108, the triggering sequences is provided in the initialization instructions. In step 110, the unencrypted instructions from the client are put in the computer. In step 112, each instruction is assigned a location in the memory 8. For each instruction, it is determined whether this instruction is to be placed into the encrypted memory section in block 114. If the instruction is to be placed in an unencrypted memory section the unencrypted instruction from the client is not modified as shown in step 116. If however, the instruction is to be placed into encrypted memory section as shown in section 118 a simulated program counter value is produced from the assigned memory location. For example, if the program counter value to fetch the contents of the assigned memory location is equal to X the simulated program counter value is equal to X. Then, the seed value and the simulated program counter value is used to produce a mask value. This step is done in the software which emulates the logic 18 of the encryption mask generator 12 of the microprocessor 2 of FIG. 1. Next, this mask value is "exclusive or'ed" with the unencrypted instruction to produce the encrypted instruction. This "exclusive or" process is done by the software program. These steps 114–119 are repeated until each instruction is either not modified if it is to be placed into an unencrypted memory section of memory 8 or modified to produce the encrypted instruction if it is to be placed into an encrypted memory section of memory 8. The determination of whether an instruction is to be placed in an encrypted section or an unencrypted section of memory 8 is done with the enable bits and the assigned memory location. In step 44', the encrypted and unencrypted instructions determined in the software program are placed into the memory 8.

Looking again at FIG. 2A, in step 46, on startup or reset of the microprocessor 2 the data on the bus line 6 from the memory 8 is not deencrypted. In the current embodiment, a dummy mask is sent from the encryption mask generator 12 to the "exclusive or" logic 10. In step 48, the initialization of the encryption system includes an instruction to load registers H and L with a seed value and enable bits. The initialization of the encryption system continues in step 50 with the running of the triggering sequence of instructions. When the instruction register of the core microprocessor 4 runs the triggering sequence, the enable bits and seed value are loaded into the encryption mask generator 12. Next, in step 52, whenever a new instruction is placed on the bus line 6, if a reset signal has just been sent to the control logic 24, the message steps back to step 46 to do a reinitialization of the microprocessor and encryption system. If it is not in a reset, the system tests the control logic 24 and determines whether a memory request is being undertaken. If a memory request is not being undertaken, the instruction is passed to the core microprocessor 4 without the encryption in the "exclusive or" logic 10. This is done by passing a dummy mask to the "exclusive or" logic 10 from the encryption mask generator 12 and the method moves back to method step 52. Next, it is tested whether a enable bit is set for the section of memory that contains the instruction as indicated by the program counter. If the enable bit is not set for the section of memory of the instruction, the instruction is passed to the core microprocessor 4 without the deencryption as discussed above in step 62. If the enable bit is set for the section of memory as indicated by program counter, the mask value produced by the logic 18 is de-encrypted in logic 10 with the mask value steps 64 and 66. The mask value is produced in the encryption mask generator 12. Next the method returns to step 52 for next instruction on data line 6 for as long as the program runs.

Various details of the implementation of method are merely illustrative of the invention. It will be understood that various changes of such details may be within the scope of the invention, which is to be limited only by the appended claims.

What is claimed:

1. A microprocessor comprising:
   a microprocessor core comprising a program counter containing a program counter value;
   an encryption mask generator attached to said program counter; and
   a logic circuit having inputs attached to the mask value generator and attached to the external data bus and having an output attached to the internal data bus connected to the microprocessor core.

2. The microprocessor of claim 1, wherein said encryption mask generator comprises means for producing a mask value from the program counter value.

3. The microprocessor of claim 1, wherein said means for producing a mask value produces said mask value from a seed value and the program counter value.

4. The microprocessor of claim 2, wherein said logic circuit comprises "exclusive or" logic circuitry which is arranged to "exclusive or" bits of the mask value from the mask value generator with bits of an encrypted instruction from the external data bus to produce the bits of the deencrypted instruction on the internal data bus.

5. The microprocessor of claim 1, further comprising a memory attached to said external data bus, said memory adapted to store said encrypted instruction.

6. The microprocessor of claim 1, wherein said core microprocessor further comprises an instruction register and storage registers and wherein said encryption mask generator further includes internal registers that are adapted to store the seed value, wherein said microprocessor further comprises sequence detect logic circuitry attached to said instruction register for causing values in said storage registers to be loaded into said internal registers.

7. The microprocessor of claim 6, wherein said internal registers include bits to store enable bits and wherein said encryption mask generator further comprises means responsive to said enable bits for producing a dummy mask value such that dummy mask value causes the logic circuit to not effect the data moving from the external data bus to the internal data bus.

8. The microprocessor of claim 7, wherein said encryption mask generator further comprises means to reset said enable bits during a microprocessor reset such that said dummy mask value producing means produces a dummy mask value.

9. A method of deencrypting an encrypted instruction in a microprocessor comprising the steps of:
   providing a program counter value corresponding to the encrypted instruction;
   producing a mask value from said program counter value; and
   deencrypting said encrypted instruction using said mask value.

10. The method of claim 9, further comprising, before said program counter value providing step, the step of encrypting an instruction and the step of storing this encrypted instruction in a memory, wherein said program counter value provided in said program counter providing step indicates the location of said encrypted instruction in the memory.

11. The method of claim 9, wherein said mask value producing step comprises the step of producing a mask value that is a function of the program counter value and a seed value.

12. The method of claim 11, further comprising the step of obtaining said seed value from a memory.

13. The method of claim 12, wherein said seed value obtaining step comprises moving the seed value to a register in a core microprocessor and detecting a sequence of instructions before saving said seed value from said register.

14. The method of claim 11, further comprising the step of obtaining said mask enable bits from said memory, said mask enable bits corresponding to sections of said memory and indicating whether the instructions from that section of memory are to be deencrypted in said deencrypting step.

15. The method of claim 9, wherein said deencrypting step comprises using an "exclusive or" function to produce the bits of a deencrypted instruction from the bits of the encrypted instruction and the bits of the mask value.

16. The method of claim 9, further comprising the step of preventing the deencryption of instruction values from said memory after a reset.

* * * * *